United States Patent
Charbit et al.

(10) Patent No.: US 8,248,997 B2
(45) Date of Patent: Aug. 21, 2012

(54) APPARATUS AND METHOD FOR POSITIONING A WIRELESS USER EQUIPMENT

(75) Inventors: Gilles Charbit, Hampshire (GB); Tommi Tapani Koivisto, Espoo (FI)

(73) Assignee: Nokia Corporation, Espoo (FI)

(*) Notice: Subject to any disclaimer, the term of this patent is extended or adjusted under 35 U.S.C. 154(b) by 484 days.

(21) Appl. No.: 12/542,639

(22) Filed: Aug. 17, 2009

(65) Prior Publication Data
US 2011/0039574 A1  Feb. 17, 2011

(51) Int. Cl.
*H04W 4/00* (2009.01)
(52) U.S. Cl. .................. 370/328; 455/456.6; 455/456.1
(58) Field of Classification Search ........................ None
See application file for complete search history.

(56) References Cited

U.S. PATENT DOCUMENTS

| | | | |
|---|---|---|---|
| 5,987,329 A * | 11/1999 | Yost et al. ................. | 455/456.1 |
| 6,453,168 B1 * | 9/2002 | McCrady et al. ............. | 455/517 |
| 6,876,859 B2 * | 4/2005 | Anderson et al. ........... | 455/456.1 |
| 7,486,233 B2 | 2/2009 | Stenberg et al. | |
| 7,636,061 B1 | 12/2009 | Thomas et al. | |
| 7,764,231 B1 * | 7/2010 | Karr et al. .................... | 342/457 |
| 2003/0008622 A1 * | 1/2003 | Fernandez-Corbaton et al. ............... | 455/68 |
| 2004/0067759 A1 | 4/2004 | Spirito et al. | |
| 2007/0008217 A1 * | 1/2007 | Yang et al. ............... | 342/357.12 |
| 2009/0149200 A1 * | 6/2009 | Jayasinghe et al. ......... | 455/456.3 |
| 2010/0039315 A1 | 2/2010 | Malkos et al. | |
| 2010/0278141 A1 * | 11/2010 | Choi-Grogan et al. ....... | 370/331 |

FOREIGN PATENT DOCUMENTS

| | | |
|---|---|---|
| WO | 9727711 A1 | 7/1997 |
| WO | 03024141 A1 | 3/2003 |
| WO | 2010064969 A1 | 6/2010 |

OTHER PUBLICATIONS

"Support for IMS Emergency Calls Over LTE", 3GPP Work Item Description, retrieved Aug. 17, 2009, 4 pages.
"PRS Pattern Design", 3GPP TSG RAN WG1 #57bis, Los Angeles, CA, USA, Jun. 29-Jul. 3, 2009, 3 pages.
"Updated Results for OTDOA Using MBSFN and Normal Subframes", 3GPP TSG RAN1 #57bis, Los Angeles, CA, USA, Jun. 29-Jul. 3, 2009, 5 pages.
"On Serving Cell Muting for OTDOA Measurements", 3GPP TSG RAN1 #57bis, Los Angeles, CA, USA, Jun. 29-Jul. 3, 2009, 7 pages.
"Analysis of UE Subframe Timing Offset Measurement Sensitivity to OTDOA Performance", 3GPP TSG RAN1 #57bis, Los Angeles, CA, USA, Jun. 29-Jul. 3, 2009, 5 pages.
"WF on RAN1 Concept for OTDOA", R1-092213, Ericsson, et al, Retrieved Aug. 17, 2009, 7 pages.

(Continued)

*Primary Examiner* — Jason Mattis
*Assistant Examiner* — James P Duffy
(74) *Attorney, Agent, or Firm* — Harrinton & Smith

(57) ABSTRACT

In accordance with an example embodiment of the present invention, a method is disclosed that comprises receiving a reference signal from each of at least two target neighbor cells via at least one receiving branch at a user equipment; estimating a timing range based at least on one of a timing advance for a serving cell and an inter-cell distance between the target neighbor cell and the serving cell; computing a reference signal time difference for the received reference signal from the target neighbor cell; and screening the computed reference signal time difference using the estimated timing range.

15 Claims, 6 Drawing Sheets

OTHER PUBLICATIONS

"Sequence Design for E-IPDL RS", 3GPP TSG-RAN WG1#56bis, Seoul, Korea, Mar. 23-26, 2009, 2 pages.

"Evaluation Parameters for Positioning Studies", 3GPP TSG-RAN WG1#56bis, Seoul, Korea, Mar. 23-27, 2009, 2 pages.

"Study on Hearability of Reference Signals in LTE Positioning Support", 3GPP TSG-RAN WG1#56bis, Seoul, South Korea, Mar. 23-29, 2009, 8 pages.

"Reference Signals for Low Interference Subframes in Downlink", 3GPP TSG-RAN WG1#56bis, Seoul, South Korea, Mar. 23-27, 2009, 8 pages.

"On OTDOA Method for LTE Positioning", TSG-RAN WG1 #56, Athens, Greece, Feb. 9-13, 2009, 6 pages.

"LTE Neighbor Cell Hearability", 3GPP TSG-RAN1 #56, Athens, Greece, Feb. 9-13, 2009, 10 pages.

"Improving the Hearability of LTE Positioning Service", 3GPP TSG RAN WG1 #55bis, Ljubljana, Slovenia, Jan. 12-16, 2009, 5 pages.

"UE Positioning in LTE", Karri Ranta-aho, Jun. 15, 2009, 20 pages.

International Search Report and Written Opinion, received in corresponding Patent Cooperation Treaty Application No. PCT/IB2010/053710. Dated Nov. 24, 2010. 12 pages.

Charitanetra, Soontorn, "Mobile Positioning Location Using E-OTD Method for GSM Network", Student Conference on Research and Development (SCOReD) 2003 Proceedings, Putrajaya, Malaysia, Aug. 25/26, 2003. pp. 319-324.

\* cited by examiner

APPARATUS AND METHOD FOR POSITIONING A WIRELESS USER EQUIPMENT

TECHNICAL FIELD

The present application relates generally to an apparatus and a method for positioning a wireless user equipment.

BACKGROUND

The number of 911 calls made from wireless phones has been increasing steadily. For example, it is estimated that about 50 percent of the millions of emergency 911 (E911) calls in U.S. on daily basis are placed from wireless phones and the percentage is growing. A method for more accurately positioning a user equipment (UE) is needed to meet the US Federal Communications Commission (FCC) E911 requirements of newer generation of wireless. For example, one requirement for Long-Term Evolution (LTE) based wireless E911 calls is that the calling UE be located within 50 meters for 67% of calls and within 150 meters for 95%.

One common method for positioning a UE is based on an observed time difference of arrival (OTDOA). In this approach, a UE reports an observed time difference (OTD) relative to the serving base station such as LTE evolution node B (eNB) between a transmitting time of a reference signal and an observed arrival time at the UE of the reference signal. Two issues may affect accurately positioning a user equipment. One issue may be OTDOA hearability and another issue may be multipath issue. Due to the hearability issue, the signals from neighboring base stations are received with very low power. The multipath issue occurs when the reference signal takes different paths when propagating from a target neighbor cell to the UE, thus causing potential distortion of the observed arrival time of the reference signal.

SUMMARY

Various aspects of the invention are set out in the claims.

In accordance with an example embodiment of the present invention, a method comprises receiving a reference signal from each of at least two target neighbor cells via at least one receiving branch at a user equipment; estimating a timing range based at least on one of a timing advance for a serving cell and an inter-cell distance between the target neighbor cell and the serving cell; computing a reference signal time difference for the received reference signal from the target neighbor cell; and screening the computed reference signal time difference using the estimated timing range.

In accordance with an example embodiment of the present invention, an apparatus comprises a radio interface module configured to receive a reference signal from each of at least two target neighbor cells via at least one receiving branch at the apparatus; a positioning module configured to estimate a timing range based at least on one of a timing advance for a serving cell and an inter-cell distance between the target neighbor cell and the serving cell; compute a reference signal time difference for the received reference signal received from the target neighbor cell; and screen the computed reference signal time difference using the estimated timing range.

In accordance with another example embodiment of the present invention, an apparatus comprises at least one radio interface module configured to receive from a coupled user equipment a transmitting time and an observed arrival time for a reference signal sent from a target neighbor cell; and a positioning module configured to estimate a timing range based at least on one of a timing advance and an inter-cell distance between the target neighbor cell and a serving cell where the apparatus is located; compute a reference signal time difference for the reference signal based at least on the transmitting time and the observed arrival time; and screen the computed reference signal time difference using the estimated timing range.

BRIEF DESCRIPTION OF DRAWINGS

For a more complete understanding of example embodiments of the present invention, reference is now made to the following descriptions taken in connection with the accompanying drawings in which.

DETAILED DESCRIPTION

The disclosure employs a timing advance and an inter-cell distance to proximate a valid timing range and then use the timing range to screen the reference signal time difference (RSTD) values to eliminate those out of range values. This helps narrow down the range of and consequently more accurately position the user equipment.

Figure 1:
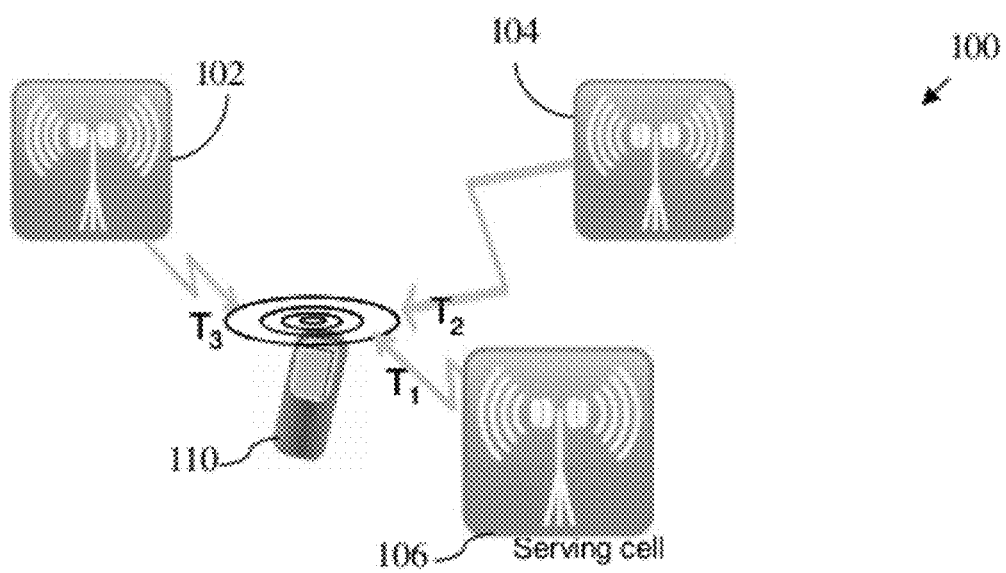
FIG. 1 illustrates an example wireless network.

FIG. 1 illustrates an example wireless network 100. The wireless network 100 includes two neighbor cells 102 and 104, a serving cell 106, and a user equipment 110. The UE 110 is within the range to communicate with at least the serving cell 106 and the two neighbor cells 102 and 104. The two neighbor cells 102 and 104 are also called target cells because they are target to be used for calculating the position of the UE 110. There may be other neighbor cells within the reach of the UE and at a minimum two target cells with strongest signals may be selected along with the serving cell to calculate the position of the UE, based on a trilateration algorithm.

In one example application scenario, the UE 110 has just moved to a new location within the serving cell 106 and this triggered the UE 110 to reports its new position within the serving cell to the serving base station within the serving cell 106. The UE 110 may receive a timing advance and an inter-cell distance from the serving base station 106. The timing advance indicates an estimated processing time to prepare a radio frame for transmission and the inter-cell distance may indicate a distance between the serving cell and each of the target cells. For the target cell, the UE 110 computes a timing range based on the timing advance and the inter-cell distance. The UE 110 may receive a reference signal from each of the target cells 102 and 104 and compute a reference signal time difference based on a transmitting time that is embedded in the received reference signal indicating the transmitting start time and an observed time of arrival. The UE 110 then uses the timing range to screen the computed reference signal time difference and eliminate those RSTD values that are outside the timing range. If the reference signal time difference is eliminated, the UE 110 may repeatedly compute and screen a new reference signal time difference until a valid value within the timing range is obtained. In a similar manner, the UE 110 may obtain three reference signal time differences for the serving cell 106 and the two target cells 102 and 104. The UE 110 may then use a trilateration algorithm to estimate the new position of the UE 110 within the serving cell 110 and report the new position to the serving base station.

Figure 2:
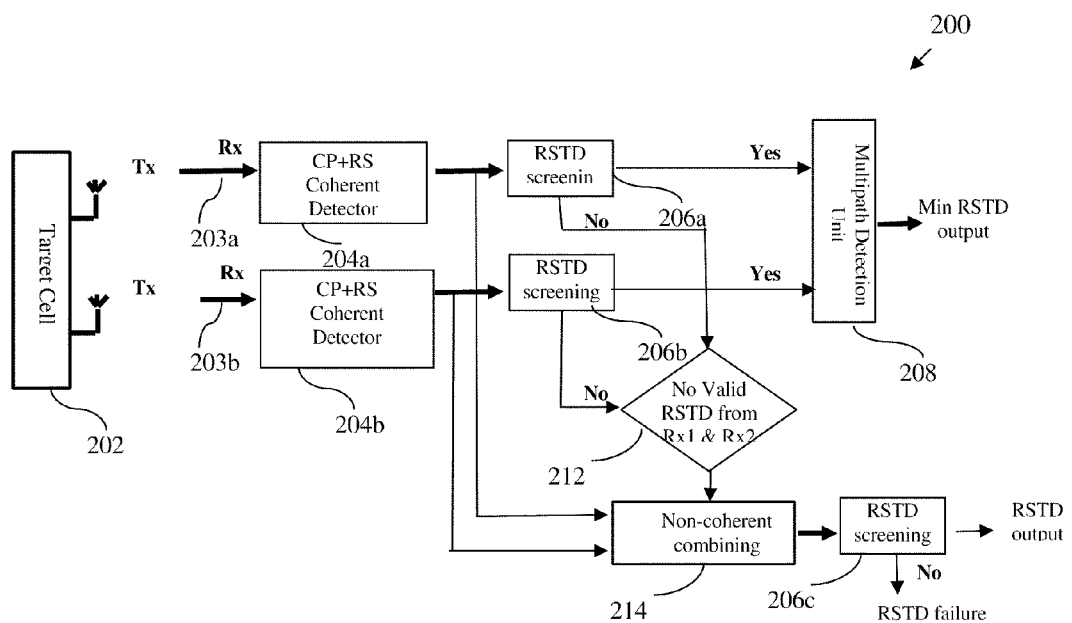
FIG. 2 illustrates an example process for finding a reference signal time difference.

FIG. 2 illustrates an example process 200 for finding a valid reference signal time difference. The example process 200 includes a target cell 202 with at least two transmitting antennas which may broadcast reference signals. A user equipment with two receiving antennas, 203a and 203b, which are also termed receiving branches, may each receive a separate reference signal from the target cell 202. Although the example 200 illustrates two receiving branches 203a and 203b, there could be more antennas in other embodiments. Two cyclic prefix (CP) and reference signal (RS) coherent detectors 204a and 204b may each detect and calculate a reference signal time difference.

The detected RSTD values are sent to two RSTD screening units 206a and 206b. Each of the RSTD screening units 206a and 206b may apply a timing range to the received reference signal time difference from the respective receiving branch and may discard the RSTD value if it falls outside the timing range. The output from the RSTD screening units 206a and 206b are checked at a logic unit 212 to decide whether there is any valid RSTD value from either of the receiving branches 203a and 203b.

In one embodiment, none of the RSTD screening units produce a valid RSTD value, the received reference signals from the CP+RS coherent detector 204a and 204b are input into a non-coherent combining unit 214 to apply a non-coherent combining technique to produce a RSTD value, which is screened at the RSTD screening unit 206c. If still there is not any valid RSTD value found, the process may be repeated again to take in new reference signal to find a valid RSTD value.

Multiple valid RSTD values may come out of the RSTD screening unit 206a and 206b. Then multiple values are input into a multipath detection unit to output a single, most suitable RSTD value. In one embodiment, the multipath detection unit 208 may apply a multipath selection algorithm to select a most suitable RSTD value. In one embodiment, the multipath detection unit 208 may use a shortest path algorithm. In other embodiment, the multiple-path detection unit 208 may use some other criteria to select an output RSTD value, the criteria such as assigning a weight to favor or disfavor a particular receiving branch when that receiving branch is deemed reliable or unreliable from the historical data.

Figure 3:
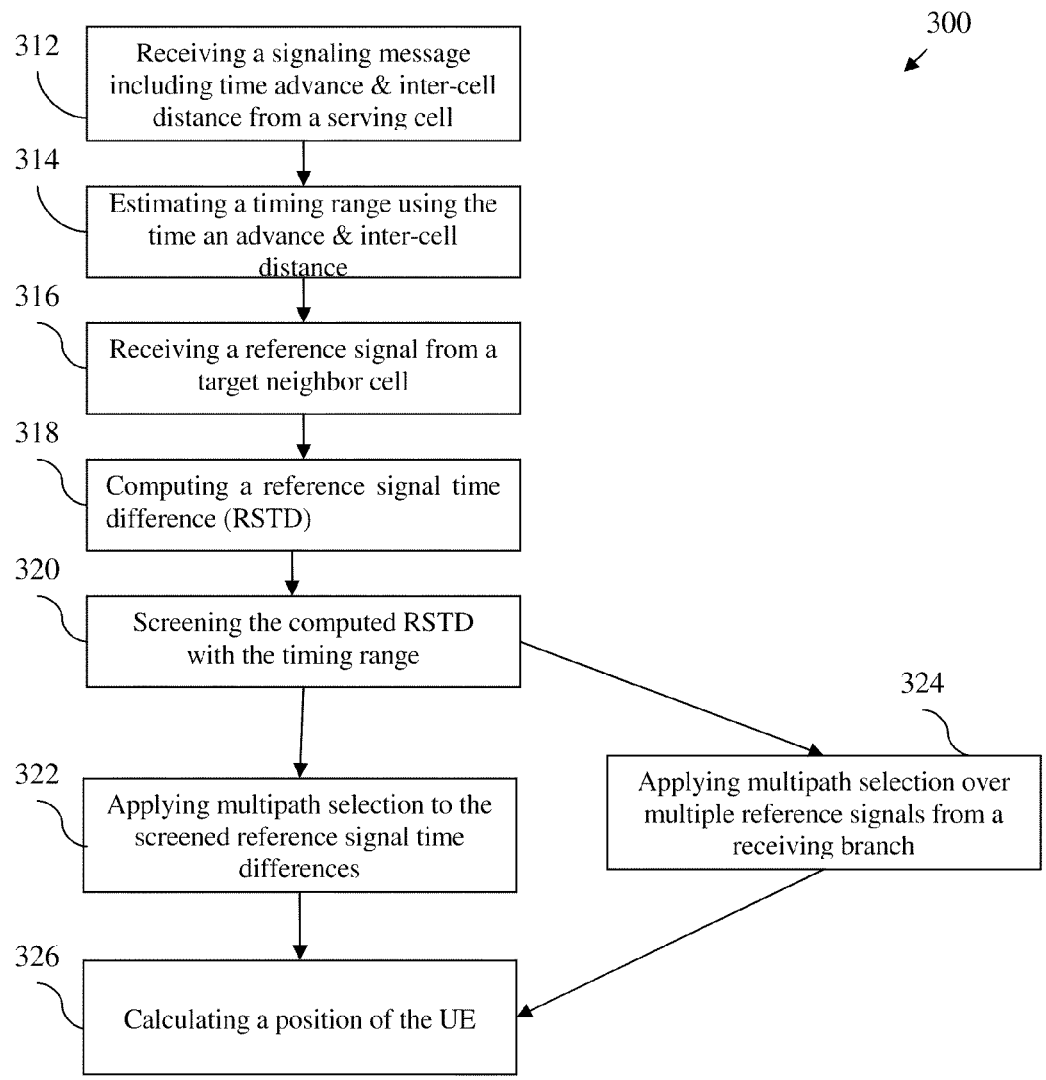
FIG. 3 illustrates an example method for positioning a user equipment at the user equipment.

FIG. 3 illustrates an example method 300 for positioning a UE. The method 300 may include receiving a signaling message containing a timing advance and an inter-cell distance from a serving cell at block 312, and estimating a timing range using the timing advance and inter-cell distance at block 314. The method 300 may also include receiving a reference signal from a target neighbor cell at block 316, computing a reference signal time difference at block 318. The method 300 may also include screening the computed reference signal time difference at block 320, applying multipath selection to the screened reference signal time differences at block 322 and calculating a position of the user equipment using a trilateration algorithm at block 326. The method 300 may also include applying multipath selection over multiple radio frames of multiple reference signals at block 324.

Receiving the signaling message from a serving cell at block 312 may include receiving a signaling message by the UE such as the UE 110 of FIG. 1, the signaling message that include the timing advance and the inter-cell distance for the target cell. The timing advance is an amount of time estimated to take to prepare one or more radio frames for a transmission from the UE to the serving eNB to ensure the uplink transmissions from the UE arrive at the serving eNB UL cell timing within a specified tolerance. The inter-cell distance is an estimated distance between the serving cell and the target cell. Receiving the timing advance and the inter-cell distance may be scheduled for a fixed interval or triggered by an event such as the UE moving to a new location within the serving cell. The timing advance may range from a few milliseconds to hundreds of milliseconds, depending on the transmission technology used and a complexity level of preparations for transmitting a radio frame. The inter-cell distance may be a relatively fixed value indicating a distance between the target cell and the serving cell. The inter-cell distance may measure a distance between two base stations of the two cells or between two closest points of the two cells.

Receiving the signaling message at block 312 may also include receiving information indicating two strongest target cells from the serving eNB. In one embodiment, the information indicating the timing advance, the inter-cell distance and two strongest target cells is included in a signaling message such as a radio resource control message. In some other embodiment, a different signaling message may be used to indicate the timing advance, the inter-cell distance and the two strongest neighbor cells.

Estimating a timing range using the timing advance and inter-cell distance at block 314 may include computing an upper bound and a lower bound of the timing range. In one example embodiment, the lower bound is set to (d−ta) and the upper bound to (d+ta) while d is an inter-cell distance between the target cell and the serving cell and ta is a timing advance for the frame transmission at the serving cell. Estimating the timing range may be performed at various points of time such as at an eNB system startup time. The parameters such as the timing advance and the inter-cell distance are relatively static and therefore, the timing range may not be updated frequently.

Estimating the timing range at block 314, in another example embodiment, may also include adjusting the timing range based on the historical performance data of the timing range. The historical performance data of the timing range may include the number of RSTD values that were above the upper bound and the number of RSTD values that were below the lower bound of the timing range for a time period. For example, if the number of the RSTD values that were screened out because the RSTD values were above the upper bound of the timing range is substantially high, then the upper bound may be adjusted to a higher value such as (ta*1.25+d) or (ta*1.5+d). For another example embodiment, if most of the RSTD values were substantially below the upper bound of the timing range, then the upper bound may be adjusted to a lower value such as (ta*0.75+d).

Receiving a reference signal from a target neighbor cell at block 316 may include receiving by the UE a periodically broadcast reference signal from the target cell. The reference signal may include, among other information, a transmitting time to indicate the time when the reference signal was transmitted. The reference signal may also include other information such as a channel estimation and physical measurements. Typical measurements that take place within the UE may include signal strength or signal-to-noise ratio (SNR), average path loss, and signal-to-interference ratio (SIR) which may be represented by a channel quality indicator (CQI). Receiving the reference signal may take place at a scheduled time or may be triggered by an event such as the UE moving to a new location within the serving cell or the UE newly moving into the serving cell. In one embodiment, the reference signal may be one of a 3GPP downlink reference signal, a common reference signal, a provisional reference signal and a dedicated positioning reference signal, among others.

Computing a reference signal time difference at block 318 may include recording an observed time of arrival of the reference signal and computing a difference between the transmitting time included in the received reference signal and the observed arrival time of the reference signal. Screening the computed reference signal time differences at block 320 may include comparing the computed RSTD value against the lower bound and the upper bound of the timing range to determine whether the RSTD value is within the timing range. If the computed RSTD value is outside the timing range, the value may be discarded and a different RSTD value may be computed from a newly received reference signal.

Applying multipath selection to the screened reference signal time differences at block 322 may include selecting one RSTD value from multiple screened RSTD values. Multiple antennas at the UE may each receive an independent reference signal from the target cell and multiple screened RSTD values may result. Each received reference signal may be viewed as a copy of the "original" reference signal sent by the target cell or target neighbor cell, because the target cell sends only one reference signal and the reference signal may travel different paths to reach the multiple receiving branches of the UE. Applying multipath selection may include applying a selection algorithm to the multiple screened RSTD values. In one example embodiment, the selection algorithm is to select the smallest RSTD value. Other selection algorithms may be employed in other example embodiments.

Applying multipath selection over multiple reference signals from a receiving branch at block 324 may take place in parallel or in alternative to applying multipath selection to the screened RSTD values at block 322. Multiple RSTD values may be collected from a single receiving branch from the target cell over multiple time slots and a multipath selection is applied to the collected multiple RSTD values to select a most suitable RSTD value. This may take place when the UE is configured with a single antenna or when the UE is configured with multiple antennas and the multipath selection is applied to each of the multiple receiving branches.

Calculating a position of the user equipment at block 326 may include collecting a RSTD value as described above from each of the target cells and the serving cell and calculating a position of the UE using a trilateration algorithm and the three RSTD values from the two target cell and the serving cell. A distance between the UE and each eNB of the neighbor cells or the serving cell may be computed based on the corresponding RSTD value. A geometric trilateration is used to combine these distances to determine the UE's location.

Figure 4:
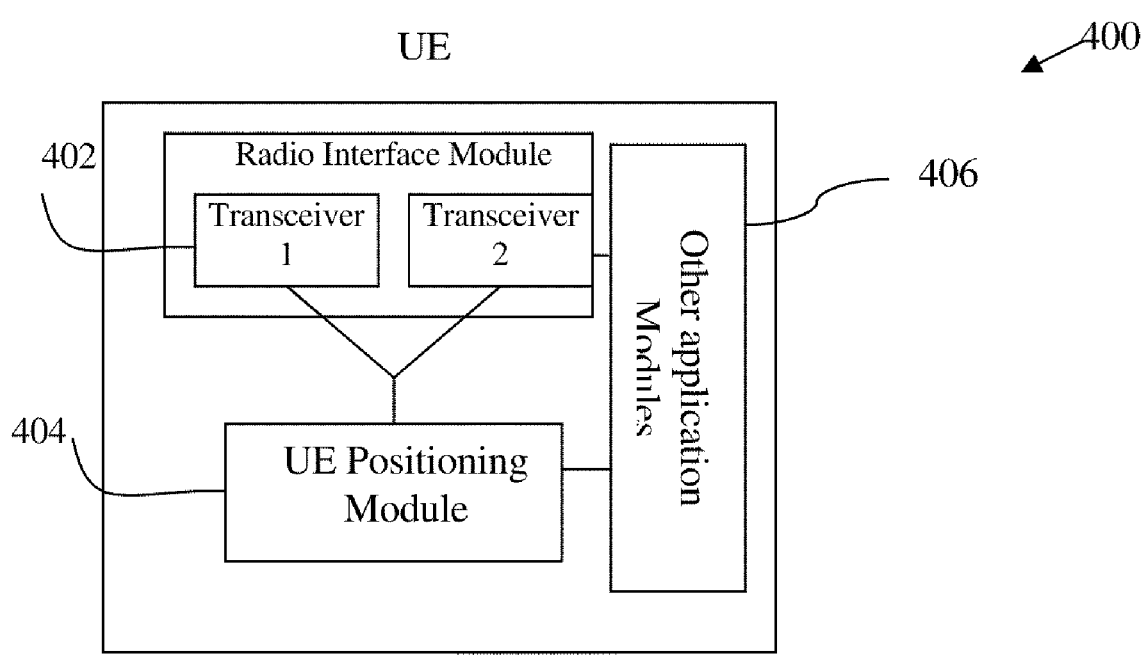
FIG. 4 illustrates an example apparatus for positioning the user equipment.

In one example embodiment, the method 300 may be implemented in the UE 110 of FIG. 1 or in the wireless apparatus 400 of FIG. 4. The method 300 is for illustration only and the steps of the method 300 may be combined, divided, or executed in a different order than illustrated, without departing from the scope of the invention of this example embodiment.

FIG. 4 illustrates an example apparatus 400 for positioning the UE. The apparatus 400 includes at least a radio interface module 402, a positioning module 404 and other application module 406.

The radio interface module 402 may be configured with multiple transceivers including multiple antennas or receiving branches. The radio interface module 402 may be configured to receive a reference signal from each of the neighbor target cells and the serving cell. In case of multi-antenna transmission, there is one resource grid defined per antenna port. An antenna port is defined by a reference signal, unique within the cell. Each element in the resource grid for an antenna port is called a resource element and is uniquely identified in the frequency and time domains. Multiple antenna ports may be supported at the interface module 402. In one embodiment, a resource block is defined as a number of consecutive OFDM symbols in the time domain with a fixed number of consecutive subcarriers in the frequency domain.

The UE positioning module 404 may be configured to estimate a timing range based at least on one of a timing advance for a serving cell and an inter-cell distance between the target neighbor cell and the serving cell, and to compute a reference signal time difference for the received reference signal received from the target neighbor cell. The positioning module 404 may also be configured to screen the computed reference signal time difference using the estimated timing range and to apply a coherent detection to the at least two reference signals to select a shortest path.

The UE positioning module 404 is further configured to apply the coherent detection to multiple reference signals received from one receiving branch over multiple time slots to select the shortest path and to adjust the timing range by narrowing down the timing range based at least on historical data of reference signal time differences. The UE positioning module 404 is also configured to estimate a location of the apparatus within the serving cell based at least on one of a direction of the received reference signal and a previous known position of the UE.

The UE positioning module 404 may be further configured to determine two strongest neighbor cells as the target cells in one of the following two ways. First it may identify at least two target neighbor cells based at least on one the following parameters so that the two target cells are the strongest among all neighbor cells and directly face the UE. The parameters may include a reference signal received power (RSRP), a reference signal received quality (RSRQ), a received power spectral density of the total noise and interference, and a received energy per resource element. Second, it may receive a signaling message from one of the serving cell and a serving mobile location center to indicate the two strongest target neighbor cells among all the neighboring cells that proximately face the UE.

In one example embodiment, the other application module 406 may include a power module, an air interface module, a baseband signal processing module, a radio frequency operating module. In one example embodiment, the apparatus 400 may be part of a 4G mobile station, or a 3GPP-compliant UE.

Figure 5:
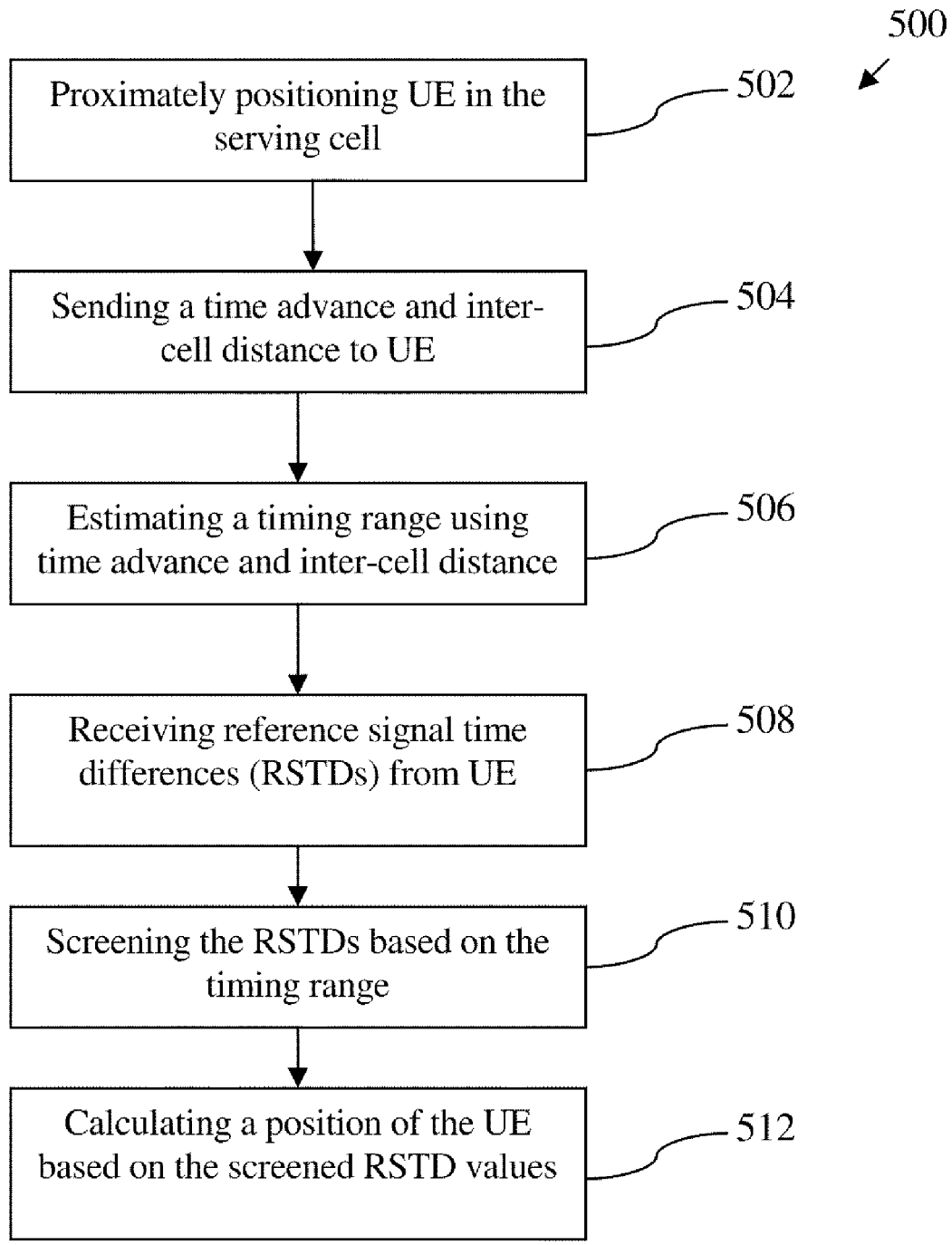
FIG. 5 illustrates an example method for positioning the user equipment at a base station.

FIG. 5 illustrates an example method 500 for positioning the UE at a serving base station such as a eNB. The method 500 may include proximately positioning a UE at block 502, sending a timing advance and an inter-cell distance to the UE at block 504 and estimating a timing range based on the timing advance and the inter-cell distance at block 506. The method 500 may also include receiving RSTD values from the UE at block 508, screening the RSTD values based on the timing range at block 510, and calculating a position of the UE based on the screened RSTD values using a trilateration algorithm at block 512.

Proximately positioning the UE in the serving cell at block 502 is to estimate a rough position of the UE in the serving cell to narrow down the area where the UE is located. In one embodiment, proximately positioning the UE may include using directional information of arrival of a reference signal to proximate the UE position. A crude direction of arrival from recent UE uplink transmissions may allow the serving eNB to determine in which part of the serving cell the UE is located, such as left or right half of the cell. Subsequently the eNB may indicate to the UE via a signalling message such as a radio resource control signalling message the physical cell identifiers (PCIs) of the two strongest target eNBs.

In another embodiment, proximately positioning the UE may include positioning the UE based on a timing correlator range and current knowledge of the UE's position in the serving cell. The serving eNB may determine which half of the serving cell the UE is located by instructing the UE to measure a common reference signal from the strong neighbour cells with a full-cell timing correlator range if the serving eNB assumes that the UE may be anywhere in the serving cell. The serving eNB may estimate the position of the UE by collecting from the UE a half-cell timing correlator range if the serving eNB is aware of which half of the serving cell where the UE currently is located.

Sending a signaling message at block 504 may include sending a signaling message such as a radio resource control message that includes a timing advance for the serving cell and an inter-cell distance between the serving cell and a target cell. The signaling message may also include an indication of the two strongest neighbor cells via their physical cell identifiers.

Estimating a timing range using the timing advance and the inter-cell distance at block 506 may include computing an upper bound and a lower bound of the timing range. In one example embodiment, the lower bound is set to (d−ta) and the upper bound to (d+ta) while d is the inter-cell distance between the target cell and the serving cell and ta is the timing advance for the frame transmission at the serving cell. Estimating the timing range may be performed at various points of time such as the eNB system startup.

Estimating the timing range at block 506, in another example embodiment, may also include adjusting the timing range based on the historical data of the timing range. The historical data of the timing range may include the number of RSTD values that were within the timing range and the number of RSTD values that were outside the timing range for a time period. For example, if the number of the RSTD values that were screened out because the RSTD values were above the upper bound of the timing range is substantially high, then the upper bound may be adjusted to a higher value such as (ta*1.25+d) or (ta*1.5+d).

Receiving RSTD values from the UE at block 508 may include receiving unscreened, multiple RSTD values from the UE via multiple receiving branches. In an alternative embodiment, receiving the RSTD values from the UE at block 508 may include receiving raw transmitting times included in the reference signals received by the UE and observed arrival times of the reference signals. The serving eNB may compute a RSTD value for each pair of a reference signal transmitting time and an observed reference signal arrival time.

Screening the computed reference signal time differences at block 510 may include comparing the computed RSTD value against the lower bound and the upper bound of the timing range to determine whether the RSTD value is within the timing range. If the computed RSTD value is outside the timing range, the value may be discarded and a different RSTD value may be computed from a newly received reference signal.

Screening the computed reference signal time differences at block 510 may also include applying a selection algorithm to the multiple screened RSTD values. In one example embodiment, the selection algorithm is to select the shortest RSTD value among multiple screened RSTD values. Other selection algorithm may be employed in other example embodiments.

Calculating a position of the UE based on the screened RSTD at block 512 may include collecting a RSTD value for each of the UE's target cells from the UE and the serving cell itself and calculating a position of the UE using a trilateration algorithm. A distance between the UE and each eNB of the neighbor cell or the serving cell may be estimated based on the corresponding RSTD value. A geometric trilateration is used to combine these distances to determine the UE's location.

Figure 6:
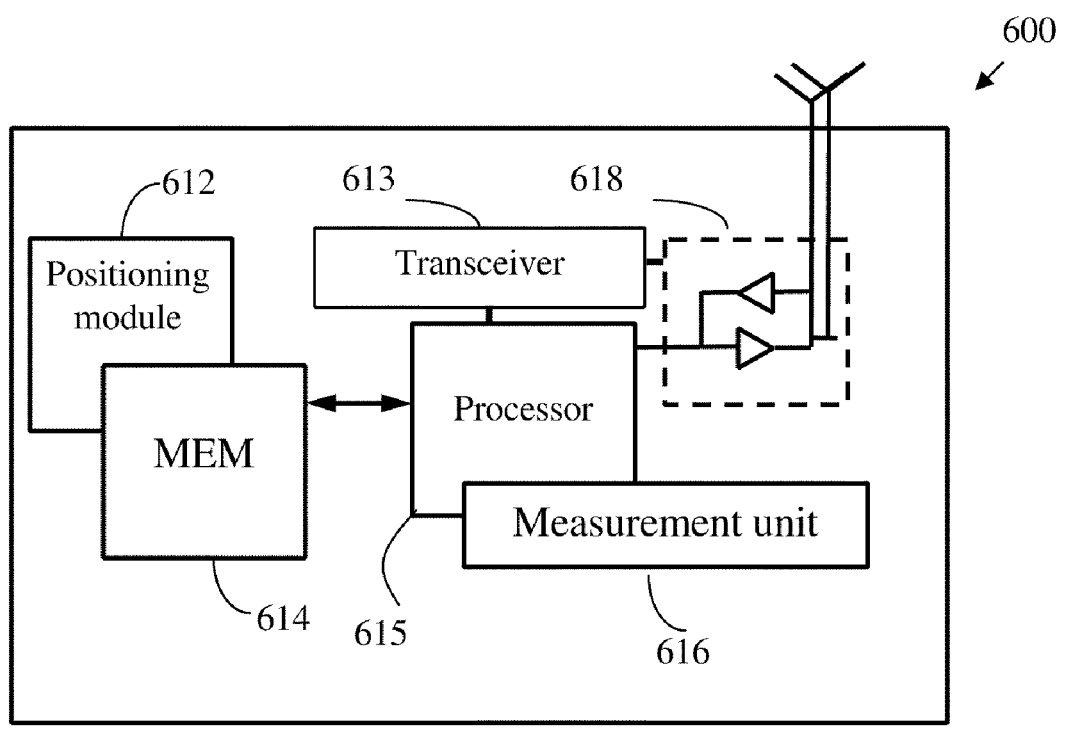
FIG. 6 illustrates an example wireless apparatus.

In one example embodiment, the method 500 may be implemented in the serving base station 106 of FIG. 1 or in the wireless apparatus 600 of FIG. 6. The method 500 is for illustration only and the steps of the method 500 may be combined, divided, or executed in a different order than illustrated, without departing from the scope of the invention of this example embodiment.

FIG. 6 illustrates a simplified block diagram of an example wireless device that is suitable for use in practicing the exemplary embodiments of at least part of this invention. In FIG. 6, the device 600 may include a processor 615, a memory 614 coupled to the processor 615, and a suitable transceiver 613 (having a transmitter (TX) and a receiver (RX)) coupled to the processor 615, coupled to an antenna unit 618. The memory 614 may store programs such as a UE positioning module 612.

The processor 615 or some other form of generic central processing unit (CPU) or special-purpose processor such as digital signal processor (DSP), may operate to control the various components of the wireless device 600 in accordance with embedded software or firmware stored in memory 614 or stored in memory contained within the processor 615 itself. In addition to the embedded software or firmware, the processor 615 may execute other applications or application modules stored in the memory 614 or made available via wireless network communications. The application software may comprise a compiled set of machine-readable instructions that configures the processor 615 to provide the desired functionality, or the application software may be high-level software instructions to be processed by an interpreter or compiler to indirectly configure the processor 615.

The transceiver 613 is for bidirectional wireless communications with another wireless device. The transceiver 613 may provide frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast fourier transforming (IFFT)/fast fourier transforming (FFT), cyclic prefix appending/removal, and other signal processing functions. For the purposes of clarity, the description here separates the description of this signal processing from the RF and/or radio stage and conceptually allocates that signal processing to some analog baseband processing unit and/or the processor 615 or other central processing unit. In some embodiments, the transceiver 613, portions of the antenna unit 618, and an analog baseband processing unit may be combined in one or more processing units and/or application specific integrated circuits (ASICs).

The transceiver 613 together with other modules such as antenna unit 618 is configured to receive from a coupled user equipment a transmitting time and an observed arrival time for a reference signal sent from a target neighbor cell.

The antenna unit 618 may be provided to convert between wireless signals and electrical signals, enabling the wireless device 600 to send and receive information from a cellular network or some other available wireless communications network or from a peer wireless device. In an embodiment, the antenna unit 618 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna unit 618 may include antenna tuning and/or impedance matching components, RF power amplifiers, and/or low noise amplifiers.

As shown in FIG. 6, the device 600 may further include a measurement unit 616, which measures the signal strength level that is received from another wireless device, and compare the measurements with a configured threshold. The measurement unit may be utilized by the device 600 in conjunction with various exemplary embodiments of the invention, as described herein.

In one embodiment, the positioning module 612 may be configured to estimate a timing range based at least on one of a timing advance and an inter-cell distance between the target neighbor cell and a serving cell and to compute a reference signal time difference for the reference signal based at least on the transmitting time and the observed arrival time. The positioning module 612 may also be configured to screen the computed RSTD values using the estimated timing range and to estimate a physical location of the user equipment within the serving cell based at least on a direction of arrival measurements at the serving cell, and an estimated distance between the UE and each of the target cell based on the RSTD value.

In general, the various exemplary embodiments of the device 600 may include, but are not limited to, part of a base station or a wireless network element having wireless communication capabilities, portable computers having wireless communication capabilities, Internet appliances permitting wireless Internet access and browsing, as well as portable units or terminals that incorporate combinations of such functions.

Without in any way limiting the scope, interpretation, or application of the claims appearing below, a technical effect of one or more of the example embodiments disclosed herein is to screen the RSTD values using a valid timing range based on parameters including a timing advance and an inter-cell distance and thus improve the accuracy of positioning the UE by reducing the potential chance for miscalculating the physical location of the UE. Another technical effect of one or more of the example embodiments disclosed herein is combining the RSTD screening with a multipath selection algorithm to determine a most suitable RSTD value in case of either a single receiving branch or multiple receiving branches.

Embodiments of the present invention may be implemented in software, hardware, application logic or a combination of software, hardware and application logic. The software, application logic and/or hardware may reside on a mobile station or user equipment, a base station or other mobile computing device. If desired, part of the software, application logic and/or hardware may reside on a mobile station, part of the software, application logic and/or hardware may reside on a base station, and part of the software, application logic and/or hardware may reside on a second mobile station. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device. A computer-readable medium may comprise a computer-readable storage medium that may be any media or means that can contain or store the instructions for use by or in connection with an instruction execution system, apparatus, or device.

If desired, the different functions discussed herein may be performed in any order and/or concurrently with each other. Furthermore, if desired, one or more of the above-described functions may be optional or may be combined.

Although various aspects of the invention are set out in the independent claims, other aspects of the invention comprise any combination of features from the described embodiments and/or the dependent claims with the features of the independent claims, and not solely the combinations explicitly set out in the claims.

It is also noted herein that while the above describes exemplifying embodiments of the invention, these descriptions should not be viewed in a limiting sense. Rather, there are several variations and modifications which may be made without departing from the scope of the present invention as defined in the appended claims.

What is claimed is:

1. A method, comprising:
   receiving at a mobile user equipment a reference signal from each of at least two target neighbor cells via at least one receiving branch;
   estimating at the mobile user equipment a timing range based at least on one of a timing advance for a serving cell and an inter-cell distance between the target neighbor cell and the serving cell;
   computing at the mobile user equipment a reference signal time difference for the received reference signal from the target neighbor cell; and
   screening at the mobile user equipment the computed reference signal time difference using the estimated timing rang;
   wherein estimating the timing range further comprises at least one of
   setting a lower bound of the timing range to (d−ta); and
   setting an upper bound of the timing range to (d+ta),
   wherein d is the inter-cell distance between the serving cell and the target neighbor cell and ta is the timing advance.

2. The method of claim 1, further comprising applying a coherent detection to plurality of reference signals received from multiple receiving branches to select a shortest path.

3. The method of claim 2, further comprising applying non-coherent combining over the plurality of the reference signal received from the multiple receiving branches if the coherent detection fails to yield the shortest path.

4. The method of claim 2, further comprising applying the coherent detection to multiple reference signals received from the at least one receiving branch over multiple time slots to select the shortest path.

5. The method of claim 1, wherein computing the reference signal time difference further comprises computing a time difference between a transmitting time of the reference signal and an observed arrival time of the reference signal for the target neighbor cell.

6. The method of claim 5, wherein screening the received reference signal further comprises discarding the received reference signal if the computed reference signal time difference is outside the estimated timing range.

7. The method of claim 6, further comprising determining a position of the user equipment based at least on the computed reference signal time difference from each of the at least two target neighbor cells and from the serving cell using a trilateration algorithm.

8. The method of claim 1, further comprising receiving from one of the serving cell and a serving mobile location center over a signaling channel at least one of
- the inter-cell distance between the user equipment and the target neighbor cells;
- the timing advance; and
- a physical cell identifier (PCI) of the target neighbor cell to help computing the reference signal time difference for the received reference signal from the target neighbor cell.

9. An apparatus, comprising:
- at least one data processor;
- at least one memory including computer program code executable by the at least one data processor;
- a radio interface module configured to receive a reference signal from each of at least two target neighbor cells via at least one receiving branch at the apparatus, where the apparatus is comprised of a mobile user equipment;
- said at least one data processor configured with said memory including computer program code to
  - estimate a timing range based at least on one of a timing advance for a serving cell and an inter-cell distance between the target neighbor cell and the serving cell;
  - compute a reference signal time difference for the received reference signal received from the target neighbor cell; and
  - screen the computed reference signal time difference using the estimated timing range,
- wherein said at least one data processor is further configured with said memory including computer program code to adjust the timing range by narrowing down the timing range based at least on historical data of reference signal time differences.

10. The apparatus of claim 9, wherein the radio interface module includes at least two receiving branches configured to receive at least two reference signals and wherein said at least one data processor is further configured with said memory including computer program code to apply a coherent detection to the at least two reference signals to select a shortest path.

11. The apparatus of claim 10, wherein said at least one data processor is further configured with said memory including computer program code to apply the coherent detection to multiple reference signals received from one receiving branch over multiple time slots to select the shortest path.

12. The apparatus of claim 9, wherein each of the reference signals is one of a common reference signal, a provisional reference signal and a position reference signal.

13. The apparatus of claim 9, wherein said at least one data processor is further configured with said memory including computer program code to estimate a location of the apparatus within the serving cell based at least on one of a direction of the received reference signal and a previous known position of the apparatus.

14. An apparatus, comprising:
- at least one data processor;
- at least one memory including computer program code executable by the at least one data processor;
- a radio interface module configured to receive a reference signal from each of at least two target neighbor cells via at least one receiving branch at the apparatus, where the apparatus is comprised of a mobile user equipment;
- said at least one data processor configured with said memory including computer program code to
  - estimate a timing range based at least on one of a timing advance for a serving cell and an inter-cell distance between the target neighbor cell and the serving cell;
  - compute a reference signal time difference for the received reference signal received from the target neighbor cell; and
  - screen the computed reference signal time difference using the estimated timing range,
- wherein said at least one data processor is further configured with said memory including computer program code to estimate a location of the apparatus within the serving cell based at least on one of a direction of the received reference signal and a previous known position of the apparatus,
- wherein said at least one data processor is further configured with said memory including computer program code to perform at least one of
  - identifying the at least two target neighbor cells based at least on one of a reference signal received power (RSRP), a reference signal received quality (RSRQ), a received power spectral density of the total noise and interference, and a received energy per resource element so that the at least two target neighbor cells are the strongest among all neighbor cells and directly face the apparatus; and
  - receiving a signaling message from one of the serving cell and a serving mobile location center indicating the two target neighbor cells are strongest among all the neighboring cells and proximately face the apparatus.

15. The apparatus of claim 9, wherein the apparatus is part of a 4G mobile station or a 3GPP-compliant user equipment.

* * * * *

UNITED STATES PATENT AND TRADEMARK OFFICE
CERTIFICATE OF CORRECTION

| | | |
|---|---|---|
| PATENT NO. | : 8,248,997 B2 | Page 1 of 1 |
| APPLICATION NO. | : 12/542639 | |
| DATED | : August 21, 2012 | |
| INVENTOR(S) | : Charbit et al. | |

It is certified that error appears in the above-identified patent and that said Letters Patent is hereby corrected as shown below:

Claim 1, col. 10, line 40 delete "rang" and insert --range--.

Signed and Sealed this
Twenty-third Day of October, 2012

David J. Kappos
*Director of the United States Patent and Trademark Office*